United States Patent
Petillon et al.

(10) Patent No.: US 10,871,374 B2
(45) Date of Patent: Dec. 22, 2020

(54) ESTIMATING THE SPEED AND THE HEADING OF AN AIRCRAFT, INDEPENDENTLY OF A MAGNETIC MEASUREMENT

(71) Applicant: AIRBUS HELICOPTERS, Marignane (FR)

(72) Inventors: Jean Paul Petillon, Miramas (FR); Julien Florens, Sausset les Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 283 days.

(21) Appl. No.: 15/794,021

(22) Filed: Oct. 26, 2017

(65) Prior Publication Data

US 2018/0120111 A1     May 3, 2018

(30) Foreign Application Priority Data

Oct. 27, 2016   (FR) ..................................... 16 01555

(51) Int. Cl.
*G01C 21/16*     (2006.01)
*G01S 19/49*     (2010.01)
(Continued)

(52) U.S. Cl.
CPC ......... *G01C 21/165* (2013.01); *G01C 23/005* (2013.01); *G01S 19/49* (2013.01); *G05D 1/0825* (2013.01); *B64D 43/02* (2013.01)

(58) Field of Classification Search
CPC ..... G01C 21/165; G01C 23/005; G01S 19/49; G05D 1/0825; B64D 43/02
See application file for complete search history.

(56) References Cited

U.S. PATENT DOCUMENTS 5,527,003 A * 6/1996 Diesel et al. .......... G01C 21/16
                                                                     701/510
5,787,384 A * 7/1998 Johnson .................. G01S 19/32
                                                                     701/472

(Continued)

FOREIGN PATENT DOCUMENTS

EP        1714166 A1    10/2006

OTHER PUBLICATIONS

French Search Report for French Application No. FR 1601555, Completed by the French Patent Office, dated Jul. 31, 2017, 9 pages.
(Continued)

*Primary Examiner* — Dale W Hilgendorf
(74) *Attorney, Agent, or Firm* — Brooks Kushman P.C.

(57) ABSTRACT

A device for estimating an aircraft's speed relative to the ground and heading, while making no use of the rotation of the Earth or of the Earth's magnetic field. The device comprises in particular a first linear estimator that hybridizes a measurement of the speed of the aircraft relative to the ground as provided by a global navigation satellite system (GNSS) receiver with measurements of the acceleration and the attitudes of the aircraft coming from an attitude and heading reference system (AHRS) device without a gyrocompass and without a magnetometer. The first estimator is made linear by replacing the single "heading error estimate $\Delta\psi$" state of prior art embodiments with two states, namely estimates of the sine and of the cosine of the heading error.

20 Claims, 2 Drawing Sheets

(51) Int. Cl.
 *G01C 23/00* (2006.01)
 *G05D 1/08* (2006.01)
 *B64D 43/02* (2006.01)

(56) References Cited

U.S. PATENT DOCUMENTS

| | | | |
|---|---|---|---|
| 7,409,289 B2 * | 8/2008 | Coatantiec et al. | G01S 19/23 |
| | | | 701/472 |
| 8,860,609 B2 | 10/2014 | Roh | |
| 9,641,718 B2 * | 5/2017 | Goto | G01S 19/20 |
| 2002/0122001 A1 * | 9/2002 | Bachinski et al. | G01S 19/49 |
| | | | 342/357.75 |

OTHER PUBLICATIONS

Shin et al. Document ION NTM 2002, Jan. 30, 2002, 12 pages, "Accuracy Improvement of Low Cost INS/GPS for Land Applications".

* cited by examiner

Fig.2

ESTIMATING THE SPEED AND THE HEADING OF AN AIRCRAFT, INDEPENDENTLY OF A MAGNETIC MEASUREMENT

CROSS-REFERENCE TO RELATED APPLICATIONS

This application claims priority to French patent application No. FR 16 01555 filed on Oct. 27, 2016, the disclosure of which is incorporated in its entirety by reference herein.

BACKGROUND OF THE INVENTION

(1) Field of the Invention

The present invention relates to the field of systems for providing assistance in piloting for aircraft. The present invention relates in particular to the field of piloting sensors for aircraft that deliver information about the speed relative to the ground and the heading of an aircraft in a reference frame that is associated with the aircraft in order to assist in piloting the aircraft.

The present invention relates to a device for estimating the speed relative to the ground and the heading of an aircraft, and also to a method of estimating said speed and heading of the aircraft. The device and the method are independent of measuring the heading magnetically.

(2) Description of Related Art

In certain modes of an autopilot, it is necessary to have a reliable estimate of the speed of an aircraft relative to the ground. For simplification purposes, the term "ground speed" is used below to specify the speed of an aircraft relative to the ground.

Aircraft have long been fitted with Doppler effect radar to provide a measurement of the ground speed of the aircraft. Nowadays, Doppler effect radar is tending to disappear and be replaced by a satellite navigation receiver that is more accurate, and above all less bulky and less expensive. This on-board receiver receives signals from a plurality of satellites belonging to one or more constellations of satellites, and co-operates with those constellations of satellites to form a satellite navigation system known as a global navigation satellite system (GNSS). A plurality of constellations are presently operational, including the GPS system of the United States of America.

In particular, a GNSS receiver on-board an aircraft can provide a measurement of the ground speed of the aircraft in a geographical reference frame together with the position of the aircraft. By way of example, a geographical reference frame, also referred to as a terrestrial reference frame or a navigation reference frame, may be formed from the directions of cardinal points, typically the directions North and East, and also by a vertical direction, generally in the direction of Earth's gravity.

Nevertheless, the piloting function of the aircraft needs an estimate of the ground speed in a body reference frame, also known as a fuselage reference frame, that is associated with the aircraft. By way of example, the fuselage reference frame may be defined by particular directions of the aircraft such as its roll axis, its pitching axis, and its yaw axis. It is therefore necessary to have a measurement of the heading of the aircraft and of its attitude angles in order to perform a projection or change of reference frame between the geographical reference frame and the fuselage reference frame.

It should also be observed that for an aircraft, and in particular for a rotary wing aircraft, the heading is different from the route angle, also referred to as the flightpath angle. Specifically, the heading is the angle between firstly an orthogonal projection of the longitudinal direction of the aircraft onto a horizontal plane defined perpendicularly to the direction of Earth's gravity, and secondly the direction of geographical North. The route angle is the angle between an orthogonal projection of the direction of the route followed by the aircraft onto such a horizontal plane and the direction of geographical North. This route direction may also be defined as the direction of the ground speed vector of the aircraft.

Nevertheless, although it is possible for a land vehicle to consider that the route angle is generally equal to the heading, that is not true for an aircraft, which might fly with a certain amount of drift corresponding to the difference between the heading and the route angle. Furthermore, a rotary wing aircraft presents the particular feature of being capable of moving sideways and even backwards, so the difference between the route angle and the heading can then be respectively ±90° and 180°.

Estimates of a magnetic heading and of attitude angles of the aircraft are nowadays available on-board an aircraft, e.g. being supplied by an attitude and heading reference system (AHRS). An AHRS device also provides measurements of the accelerations of the aircraft.

The AHRS device makes use firstly of measurements from gyros and accelerometers for estimating the attitudes of the aircraft, and secondly of magnetic measurements, specifically for estimating the magnetic heading of the aircraft. The estimate of the heading is sometimes said to be "gyromagnetic" since it is aligned on the measurement of the magnetometer over the long term, but it makes full use of gyro measurements over the short term.

AHRS devices have a command available to the pilot for changing the mode of operation of their heading estimator so as to ignore temporarily the long term alignment on magnetic measurements. This mode of operation could be said to be "directional" or to be "pure gyro". Heading is then insensitive to potential magnetic disturbances that might corrupt it. This mode is typically used on approaching a ship or an oil platform. Nevertheless, this mode of operation cannot be used for more than a few tens of minutes, since otherwise the heading error due to the bias of the gyros and appearing as drift will become prohibitive.

The difficulty with that type of heading estimator is that the pilot might forget to switch into directional mode before approaching a zone that is magnetically disturbed. It is also possible to encounter situations in which the pilot brings the aircraft close to the ground without being aware that the zone is disturbed, e.g. by buried metal infrastructures.

There is therefore a need to prepare a heading that is more robust, while nevertheless not making use of an expensive inertial unit with an alignment time on starting that can be prohibitive for certain aircraft missions.

In order to eliminate magnetic measurements totally from the piloting sensor system, since they might be corrupted, it is possible to calculate another estimate of the heading, distinct from the gyromagnetic estimate, and operating continuously in directional mode. Such a heading estimate is then effectively independent of any magnetic measurement. In contrast, such a heading estimate, which is continuously in directional mode, is affected by error that can be unlimited, including when the system is started. For example, if the heading estimate is initialized on North while the nose of the aircraft is pointing south, then the error may be as great as 180°, even though the systems have only just been switched on.

The problem is thus to make use of a heading in permanent directional mode, which heading might therefore be affected by an error of amplitude that is unbounded, but that varies slowly.

By way of example, in order to solve this problem, known Document U.S. Pat. No. 8,860,609 describes coupling a GNSS receiver with an inertial navigation system, and using an integration filter. The speed or the position of an aircraft, as supplied by the GNSS receiver, is combined with the inertial measurements of the inertial navigation system using a non-linear model. The integration filter uses an extended Kalman filter for estimating firstly an estimated combined position and combined speed, and also at least one speed bias or heading bias. Nevertheless, the use of extended Kalman filters is no more than an approximation to the process that is to be estimated, and is therefore not applicable when there might be large values of heading error.

Another solution consists in replacing the magnetic heading measurement with a pure gyro measurement. For this purpose, the AHRS device with a magnetometer is replaced by an inertial unit, or by an AHRS device capable of becoming aligned in gyro mode, i.e. based firstly on detecting the direction of the Earth's rotation during the alignment stage, and secondly on gyros that are sufficiently accurate to be capable of operating subsequently in pure gyro mode. Such a measurement device is considerably more expensive than an AHRS device with a magnetometer. Furthermore, the time required for gyro alignment is much longer than the time required for magnetometer alignment, which can be detrimental for missions when initialization time is crucial.

Those solutions therefore do not satisfy the need for the piloting function of an aircraft to have an accurate estimate of its ground speed that is independent of magnetic measurements, that does not require the use of expensive inertial units, and that is not troublesome to use.

Furthermore, the publication "Accuracy Improvement of Low Cost INS/GPS for Land Applications", by Eun-Hwan SHIN, January 2002, describes research carried out to demonstrate that low-cost inertial units in combination with a GNSS receiver can be sufficiently reliable and accurate for use in a land vehicle, such as a car. In particular, their publication discloses how to initialize the angles of the vehicle and in particular its heading by using the speed information supplied by the GNSS receiver.

Also known is Document U.S. Pat. No. 5,787,384, which describes a navigation device including a GNSS receiver hybridized with an inertial unit. Furthermore, that device includes at least one Kalman filter, in particular for correcting errors due to the GNSS receiver and errors due to the inertial unit.

Finally, Document EP 1 714 166 describes a device for monitoring the integrity of position and speed information delivered by a hybrid system having a GNSS receiver and an inertial unit.

BRIEF SUMMARY OF THE INVENTION

An object of the present invention is thus to avoid the above-mentioned limitations and to propose hybridizing a GNSS receiver and an AHRS device in order to estimate the hybrid ground speed and the heading of the aircraft, independently of any magnetic measurement so as to be insensitive to any magnetic disturbances in the environment of the aircraft. Regardless of the amplitude of an error affecting the very imprecise gyro estimate of the heading of the aircraft, the present invention is capable of correcting it and thus of estimating accurate and reliable values for the ground speed and the heading of the aircraft.

In this context, the present invention proposes a device for estimating the ground speed and the heading of an aircraft, and also a method of estimating the ground speed and the heading.

According to the invention, a device for estimating the ground speed and the heading of an aircraft, where the aircraft has three axes forming a fuselage reference frame $(X^B, Y^B, Z^B)$ rigidly associated with the structure of the aircraft, comprises:

a GNSS receiver receiving signals from a plurality of satellites and configured to provide a measurement $\vec{v}_{GNSS}$ of a ground speed vector $\vec{v}^N$ of the aircraft in a geographical reference frame $(X^N, Y^N, Z^N)$, the geographical reference frame $(X^N, Y^N, Z^N)$ including in particular a horizontal plane $(X^N, Y^N)$ that is substantially perpendicular to the Earth's gravity direction;

an AHRS device providing a measurement $\vec{\gamma}^B$ of an acceleration vector of the aircraft in the fuselage reference frame $(X^B, Y^B, Z^B)$ together with estimates $\varphi$, $\theta$ of its attitude angles, and a directional estimate $\psi_{DIR}$ of the heading of the aircraft; and a first estimator connected to the GNSS receiver and to the AHRS.

The device of the invention is remarkable in that said first estimator is linear and configured to prepare an estimate $\Delta\psi$ of the unbounded error affecting the directional estimate $\psi_{DIR}$ of the heading determined by the AHRS device, by combining the measurement $\vec{v}_{GNSS}$ of the ground speed vector with the estimates $\varphi$, $\theta$ of the attitude angles, with said directional estimate $\psi_{DIR}$ of the heading, and with the measurement $\vec{\gamma}^B$ of the acceleration vector, independently of any magnetic measurement.

The input data to said first estimator is thus provided firstly by the AHRS and secondly by the GNSS receiver, respectively in the fuselage reference frame $(X^B, Y^B, Z^B)$ and in the geographical reference frame $(X^N, Y^N, Z^N)$. In particular, the directional estimate $\psi_{DIR}$ of the heading is not derived from a magnetic measurement.

By way of example, this directional estimate $\psi_{DIR}$ of the heading is calculated and provided directly by the AHRS device. This directional estimate $\psi_{DIR}$ of the heading may also be calculated by another computer present in the aircraft, in particular on the basis of measurements provided by gyros of the AHRS device, and in particular estimates $\varphi$, $\theta$ of attitude angles. This directional estimate $\psi_{DIR}$ of the heading is thus determined by integrating the estimated angular speed $\dot\psi$ of the aircraft.

The geographical reference frame $(X^N, Y^N, Z^N)$ may for example be formed from the directions of cardinal points, preferably the directions North and East, and by a direction that is substantially vertical. The substantially horizontal plane $(X^N, Y^N)$ belonging to this geographical reference frame $(X^N, Y^N, Z^N)$ is substantially perpendicular to the Earth's gravity direction and thus has axes $X^N$, $Y^N$, which are respectively the North direction and the East direction.

The fuselage reference frame $(X^B, Y^B, Z^B)$, of the aircraft is rigidly associated with the structure of the aircraft. By way of example it is formed by particular directions of the aircraft, e.g. its longitudinal, transverse, and normal directions, corresponding respectively to its roll, pitching, and yaw axes.

For relatively small values of the attitude angles, these attitude angles of the aircraft are the two angles between a plane that is horizontal, namely perpendicular to the Earth's gravity direction, and the longitudinal direction and the transverse direction respectively of the aircraft. The directional estimate $\psi_{DIR}$ of the heading is the angle between an orthogonal projection of the longitudinal direction of the aircraft onto the horizontal plane and a direction in the horizontal plane $(X^N, Y^N)$ that is arbitrary, but substantially constant, i.e. that varies slowly over time.

The purpose of the device of the invention for estimating the ground speed and the heading of an aircraft is to use information delivered by the AHRS device to determine an estimate $\vec{v}^N$ of the ground speed vector of the aircraft, and then to compare this estimate with the measurement $\vec{v}_{GNSS}$ of the same ground speed vector as provided by the GNSS receiver, in order to prepare an estimate $\Delta\psi$ of the error affecting the directional estimate $\psi_{DIR}$ of the heading, and then to deduce corrections therefrom, for application to the inputs of the estimators for estimating the geographical heading error and the ground speed, so that the estimate $\vec{v}^N$ remains in alignment over the long term with the measurement $\vec{v}_{GNSS}$.

For said comparison to be possible, the estimate $\vec{v}^N$ of the ground speed vector must be expressed in the same reference frame as the measurement $\vec{v}_{GNSS}$ of the ground speed vector as provided by the GNSS receiver. For this purpose, the measurement $\vec{\gamma}^B$ of the acceleration vector of the aircraft as made by the AHRS device must firstly be projected onto a local horizontal reference frame $(X^H, Y^H)$ by using the estimates $\varphi$, $\theta$ for the attitude angles, which also come from the AHRS device, in order to prepare an estimate $\vec{\gamma}_{Hor}$ of the horizontal component of the acceleration vector.

Thereafter, this estimate $\vec{\gamma}_{Hor}$ of the horizontal component of the acceleration needs to be transferred to the estimate of the horizontal plane $(X^N, Y^N)$. This transfer between the local horizontal reference frame $(X^H, Y^H)$ and the estimate of the horizontal plane $(X^N, Y^N)$ is broken down into two steps: a first transfer by the directional estimate $\psi_{DIR}$ of the heading from the AHRS device, and then a second transfer by the current estimate of the error $\Delta\psi$. The acceleration vector as obtained in this way is based on the estimate of the error $\Delta\psi$. It is thus likewise an estimate rather than a measurement.

Said estimate of the acceleration vector in the horizontal plane $(X^N, Y^N)$ is then integrated in order to obtain an estimate $\vec{v}^N$ of the ground speed vector, expressed likewise in the horizontal plane $(X^N, Y^N)$.

The estimate $\vec{v}^N$ of the ground speed vector as obtained in this way is then subtracted from the measurement $\vec{v}_{GNSS}$ of the ground speed vector made by the GNSS receiver in order to determine speed differences, which are themselves used for preparing corrections that are applied to the inputs of the three estimator integrators, firstly for estimating the heading error, and secondly for estimating the two horizontal components of the ground speed of the aircraft.

As described above, the system constitutes a three-state estimator, these three states being the estimates $\vec{v}^N$ of the two horizontal components of the ground speed vector, and the estimate $\Delta\psi$ of the error affecting the directional estimate $\psi_{DIR}$ of the heading. The main difficulty in implementing this estimate lies in the highly non-linear character of heading error propagation.

Such a non-linear formulation can be resolved by using a method of local linearization, such as an extended Kalman filter (EKF), or by using a method with a higher order approximation of the non-linearity, such as for example an unscented Kalman filter (UKF) or a Cubature Kalman filter (CKF).

Nevertheless, each of those methods is only an approximation to the reality of the process, with various degrees of accuracy. However none of those methods is capable of modeling with sufficient accuracy a nonlinearity such as presented by the sine and the cosine of an unbounded angle, which might for example vary over a complete revolution.

The device of the invention for estimating the ground speed and the heading of an aircraft includes a first estimator that is of linear type. The device of the invention thus avoids a non-linear formulation and, as a result, avoids using a method of local linearization or indeed a method of approximating the non-linearity. This linear first estimator is configured to prepare an estimate $\Delta\psi$ of the error affecting the directional estimate of the heading by combining the measurements $\vec{v}_{GNSS}$ of the ground speed vector with the estimates $\varphi$ and $\theta$ of the attitude angles, with the directional estimate $\psi_{DIR}$ of the heading, and with the measurement $\vec{\gamma}^B$ of the acceleration vector.

Said first estimator is a linear estimator having at least four states, which are the estimated values $v_x^N$ and $v_y^N$ of the horizontal components of the ground speed vector in the horizontal plane of the horizontal reference frame $(X^N, Y^N)$, and the estimated values $C\Delta\psi$ and $S\Delta\psi$ for the values of the cosine and of the sine of the error affecting the directional estimate $\psi_{DIR}$ of the heading.

This first estimator constitutes a hybridizing filter and has a plurality of calculation blocks making it possible, after several transformations, to use the information provided by the AHRS device to determine the estimated values $v_x^N$ and $v_y^N$ of the horizontal components of the ground speed vector $\vec{v}^N$ in the horizontal reference frame $(X^N, Y^N)$, to compare them with the measurement $\vec{v}_{GNSS}$ of the ground speed vector made by the GNSS receiver, and to prepare an estimate $\Delta\psi$ of the error affecting the directional estimate $\psi_{DIR}$ of the heading from the AHRS device. The device of the invention can then calculate an estimated value $\psi$ for the geographical heading and an estimate $\vec{v}^N$ of the horizontal component of the ground speed vector of the aircraft.

The first estimator comprises in particular:

a first projection operator for projecting the fuselage reference frame $(X^B, Y^B, Z^B)$ onto a local horizontal reference frame $(X^H, Y^H)$, the local horizontal reference frame $(X^H, Y^H)$ being formed firstly by a projection $X^H$ onto a horizontal plane of the direction $X^B$ of the fuselage reference frame $(X^B, Y^B, Z^B)$, and secondly by a direction $Y^H$ perpendicular to said projection $X^H$ and situated likewise in the horizontal plane;

a second projection operator for projecting the local horizontal reference frame ($X^H$, $Y^H$) onto a horizontal pseudo-geographical reference frame ($X^{N*}$, $Y^{N*}$), the horizontal pseudo-geographical reference frame ($X^{N*}$, $Y^{N*}$) being defined from the local horizontal reference frame ($X^H$, $Y^H$) and from the directional estimate $\psi_{DIR}$ of the heading, the directions $X^{N*}$ and $Y^{N*}$ of the horizontal pseudo-geographical reference frame ($X^{N*}$, $Y^{N*}$) each forming an angle equal to the directional estimate $\psi_{DIR}$ of the heading with a respective one of the directions $X^H$ and $Y^H$ of the local horizontal reference frame ($X^H$, $Y^H$);

a linear transformation operator for transforming said horizontal pseudo-geographical reference frame ($X^{N*}$, $Y^{N*}$) to an estimate ($X^N$, $Y^N$) of the horizontal geographical reference frame, the angle between said estimate of the horizontal geographical reference frame and the horizontal pseudo-geographical reference frame ($X^{N*}$, $Y^{N*}$) being the current estimate $\Delta\psi$ of the error affecting the directional estimate of the heading; and a feedback loop having its gains calculated by using the equations of the Kalman filter, for example.

It should be recalled that a linear estimator is based on a linear model of the process, which may for example be formulated as follows in continuous time:

$$\frac{d}{dt}x(t) = F(t) \cdot x(t) + w_c(t) \text{ and } z(t) = H(t) \cdot x(t) + w_m(t).$$

In a device in accordance with the invention, the state vector x(t) comprises in particular the estimated values $S\Delta\psi$ and $C\Delta\psi$ for the sine and the cosine of the error affecting the directional estimate $\psi_{DIR}$ of the heading, together with the two estimated values $v_x^N$ and $v_y^N$ for the horizontal components of the ground speed vector in the geographical reference frame ($X^N$, $Y^N$, $Z^N$) such that:

$$x(t) = \begin{pmatrix} C\Delta\psi \\ S\Delta\psi \\ v_x^N \\ v_y^N \\ \ldots \end{pmatrix}.$$

In a device in accordance with the invention, the estimation vector of the measurement comprises at least the two estimated values $v_x^N$, $v_y^N$ for the horizontal components of the ground speed vector in the geographical reference frame ($X^N$, $Y^N$, $Z^N$) such that:

$$z(t) = \begin{pmatrix} v_x^N \\ v_y^N \\ \ldots \end{pmatrix}.$$

In a device in accordance with the invention, the matrix relating the derivative of the state vector x(t) to the state vector x(t) comprises at least the following-matrix where $\tau$ is a time constant, e.g. equal to 600 seconds (600 s):

$$F(t) = \begin{pmatrix} -\frac{1}{\tau} & 0 & 0 & 0 & \ldots \\ 0 & -\frac{1}{\tau} & 0 & 0 & \ldots \\ \gamma_x^{N*} & -\gamma_y^{N*} & 0 & 0 & \ldots \\ \gamma_y^{N*} & \gamma_x^{N*} & 0 & 0 & \ldots \\ \ldots & \ldots & \ldots & \ldots & \ldots \end{pmatrix}.$$

In a device in accordance with the invention, the measurement matrix, also referred to as the "observation" matrix, relating the estimation vector z(t) of the measurement to the state vector x(t), comprises at least the following sub-matrix:

$$H(t) = \begin{pmatrix} 0 & 0 & 1 & 0 & \ldots \\ 0 & 0 & 0 & 1 & \ldots \\ \ldots & \ldots & \ldots & \ldots & \ldots \end{pmatrix}.$$

The linear model of a process involved in formulating an estimator further comprises two noise vectors, which are added respectively to the command ($w_c(t)$) and to the measurement ($w_m(t)$).

Furthermore, the device of the invention for estimating the ground speed and the heading of an aircraft may include a trigonometric calculation and a difference operator. The trigonometric calculation serves to determine an estimate $\Delta\psi$ of the error angle affecting the directional estimate $\psi_{DIR}$ of the heading from the estimated values $C\Delta\psi$ and $S\Delta\psi$ for the values of its cosine and its sine. By way of example, the trigonometrical calculation uses the two-argument trigonometric function "A TAN 2", which function is the reciprocal of the trigonometric tangent function. It also makes it possible to find the angle in its complete domain $[-\pi \ldots \pi[$ when applied to the two estimated values $S\Delta\psi$ and $C\Delta\psi$ in order to determine an estimate $\Delta\psi$ of the error affecting the directional estimate $\psi_{DIR}$ of the heading.

The difference operator then makes it possible to subtract said estimate $\Delta\psi$ from the directional estimate $\psi_{DIR}$ of the heading in order to generate an estimated value $\psi$ of the geographical heading. This estimated value $\psi$ of the geographical heading is thus corrected of the error affecting the directional estimate $\psi_{DIR}$ of the heading as provided by the device of the AHRS type.

Thus, without making use of magnetic measurements, a device in accordance with the invention makes it possible to combine inertial measurements provided by an AHRS device, expressed in a fuselage reference frame, with speed measurements provided by a GNSS receiver, expressed in a geographical reference frame. Also, the heading estimate provided by a device in accordance with the invention, likewise without making use of magnetic measurements, makes it possible to express the ground speed vector in a manner that is robust and reliable in the local horizontal reference frame, as is required by piloting relationships.

In a variant of the invention, the device for estimating the ground speed and the heading of an aircraft may include a second estimator operating by means of an approximation known to the person skilled in the art as the "small angles" approximation. The first estimator then operates during an initial stage of convergence, and once convergence is achieved on the estimate $\Delta\psi$ of the error, it is subsequently replaced by the second estimator in order to continue estimating the error $\Delta\psi$, and consequently to improve the accuracy of the estimated values for the ground speed of the aircraft and for its geographical heading. In this variant, the device for estimating the ground speed and the heading of an aircraft includes a switch, so that the estimate $\Delta\psi$ of the error is provided either by the first estimator or else by the second estimator.

The second estimator then replaces the first estimator as a function of the operation of the device of the invention for estimating the ground speed and the heading of an aircraft, and in particular as a function of one or more internal values of the first estimator.

For example, the second estimator replaces the first estimator from the instant at which the covariance associated with the estimate $\Delta\psi$ of the error becomes less than a first predetermined threshold.

Advantageously, the second estimator is thus used from the instant at which an estimate $\Delta\psi$ of the error is available that is sufficiently accurate. Initially, the first estimator makes a first estimate $\Delta\psi$ of the error by estimating its sine and cosine, so as to bypass the difficulty of the non-linearity of the model, after which, in a second stage, the second estimator can refine and maintain the estimate $\Delta\psi$ of the error.

In another embodiment of the invention, the second estimator replaces the first estimator as from the instant at which the modulus of the vector formed by the estimated values $S\Delta\psi$, $C\Delta\psi$ for the sine and the cosine of the angular error become close to unity, to within a margin, such as:

$$|1-\sqrt{(S\Delta\psi)^2+(C\Delta\psi)^2}|<\text{margin}.$$

The device of the invention for estimating the ground speed and the heading of an aircraft may equally well combine both of these conditions. In this embodiment, the second estimator replaces the first estimator, e.g. as from the instant at which at least one of the two conditions specified above is satisfied.

The first threshold applied to the covariance associated with the estimate $\Delta\psi$ of the angular error may for example be of the order of $(10°)^2$, and the difference of the modulus of the vector formed by the estimated values $S\Delta\psi$, $C\Delta\psi$ from a modulus of unity is of the order of 10%, i.e.: margin=0.1.

It should be observed that during any one flight of an aircraft fitted with the device of the invention for estimating the ground speed and the heading, replacement of the first estimator by the second estimator is generally permanent. As a result, the first estimator operates during an initial convergence stage and the second estimator is used subsequently until the device is switched off, generally corresponding to the end of the flight of the aircraft.

Nevertheless, if the covariance associated with the estimate $\Delta\psi$ of the error affecting the estimate $\psi_{DIR}$ of the heading provided by the device of AHRS type begins to increase strongly as a result of a very long stage of flight without any turns or changes of speed taking place, it is possible in certain embodiments of the invention to make provision for being able to use the first estimator once more as a replacement for the second estimator. Specifically, proper operation of the second estimator might then be compromised, since the "small angles" assumption might no longer apply. For example, this happens when the covariance associated with the error $\Delta\psi$ returns to being greater than $(30°)^2$.

By using the small angles approximation, the second estimator makes it possible to use the estimate $\Delta\psi$ directly as a state, without making use of the sine and cosine trigonometric functions. As a result, the second estimator satisfies the minimality requirement for the state representation, and thus uses a model that is linearized by the "small angles" assumption.

By way of example, such a model made linear by the "small angles" assumption makes it possible to simplify the trigonometric functions, because the cosine of a small angle is approximated by the value one and the sine of a small angle is approximated by the value of that small angle expressed in radians.

Said second estimator may also have more than three states, thus making it possible to use a model that is closer to reality than the model of the first estimator for the errors affecting the AHRS device, and in particular for the directional estimate $\psi_{DIR}$ of the heading. This reconfiguration advantageously makes it possible to improve the accuracy of the values estimated for the ground speed and for the geographical heading by the device of the invention.

By way of example, the second estimator may adopt an estimator structure having at least seven states:

the estimate $\Delta\psi$ of the error affecting the directional estimate of the heading, which is assumed to be small in value;

the estimates of the two errors affecting the estimates $\varphi$, $\theta$ for the attitude angles delivered by the AHRS device (it is likewise assumed that these errors are small angles);

the estimated values $v_x^N$ and $v_y^N$ for the horizontal components of the ground speed vector of the aircraft; and the estimate of the horizontal portion (two components $\Delta\gamma_x^H$ and $\Delta\gamma_y^H$) of the bias vector affecting the measurement of the acceleration vector of the aircraft coming from the AHRS device.

The present invention also provides a method of estimating the ground speed and the heading of an aircraft. The method comprises the following steps:

a first step of providing a measurement $\vec{v}_{GNSS}$ of the ground speed vector of the aircraft in the geographical reference frame $(X^N, Y^N, Z^N)$, this geographical reference frame $(X^N, Y^N, Z^N)$ including in particular a horizontal plane $(X^N, Y^N)$ that is substantially perpendicular to the Earth's gravity direction;

a second step of providing a measurement $\vec{\gamma}^B$ of an acceleration vector of the aircraft in a fuselage reference frame $(X^B, Y^B, Z^B)$ rigidly associated with the aircraft, together with estimates $\varphi$, $\theta$ of attitude angles and a directional estimate $\psi_{DIR}$ of the heading of the aircraft; and a third step of preparing an estimate $\Delta\psi$ of the error affecting the directional estimate $\psi_{DIR}$ of the heading of the aircraft, which preparation is performed in a manner that is linear and makes it possible to estimate an unbounded error affecting the directional estimate $\psi_{DIR}$ of the heading by combining the measurement $\vec{v}_{GNSS}$ of the ground speed vector with the estimates $\varphi$, $\theta$ of the attitude angles, with the directional estimate $\psi_{DIR}$ of the heading, and with the measurement $\vec{\gamma}^B$ of the acceleration vector.

Furthermore, the third step of preparing the estimate $\Delta\psi$ of the error affecting the directional estimate $\psi_{DIR}$ of the heading may be broken down into a plurality of sub-steps:

a first sub-step of projecting the measurement $\vec{\gamma}^B$ of the acceleration vector onto a local horizontal reference frame $(X^H, Y^H)$ while using the estimates $\varphi$, $\theta$ of the attitude angles in order to obtain an estimate r of a horizontal component of the acceleration vector, the local horizontal reference frame $(X^H, Y^H)$ being formed firstly by a projection $X^H$ of the direction $X^B$ of the fuselage reference frame $(X^B, Y^B, Z^B)$ onto a horizontal plane, and secondly by a direction $Y^H$ perpendicular to the projection $X^H$ and situated in the horizontal plane;

a second sub-step of projecting the estimate $\vec{\gamma}^H$ of the horizontal component of the acceleration vector onto a horizontal pseudo-geographical reference frame ($X^{N*}$, $Y^{N*}$) in order to obtain a pseudo-geographical estimate $\vec{\gamma}^{N*}$ of a horizontal component of the acceleration vector, the horizontal pseudo-geographical reference frame ($X^{N*}$, $Y^{N*}$) being defined from the local horizontal reference frame ($X^H$, $Y^H$) and from the directional estimate $\psi_{DIR}$ of the heading, the directions $X^{N*}$ and $Y^{N*}$ of the horizontal pseudo-geographical reference frame ($X^{N*}$, $Y^{N*}$) each forming an angle equal to the directional estimate $\psi_{DIR}$ of the heading with a respective one of the directions $X^H$ and $Y^H$ of the local horizontal reference frame ($X^H$, $Y^H$);

a third sub-step of using the matrix $$\begin{pmatrix} C\Delta\psi & S\Delta\psi \\ S\Delta\psi & C\Delta\psi \end{pmatrix}$$

to transform the horizontal estimate $\vec{\gamma}^{N*}$ the horizontal component of the acceleration vector in the pseudo-geographical reference frame linearly so as to obtain an estimate $\vec{\gamma}^N$ of a horizontal component of the acceleration vector in a geographical reference frame, the estimate $\vec{\gamma}^N$ of the acceleration in the geographical reference frame thus being corrected with the estimate $\Delta\psi$ of the error affecting the directional estimate $\psi_{DIR}$ of the heading, by means of the estimated values $C\Delta\psi$ and $S\Delta\psi$ for its sine and cosine;

a fourth sub-step of integrating the estimate $\vec{\gamma}^N$ of the acceleration vector in the pseudo-geographical reference frame in order to obtain an estimate $\vec{v}^N$ of the ground speed vector in the horizontal geographical reference frame ($X^N$, $Y^N$) taking account of the estimate $\Delta\psi$ of the error affecting the directional estimate $\psi_{DIR}$ of the heading;

a fifth sub-step of comparing the estimate $\vec{v}^N$ of the ground speed vector in the horizontal geographical reference frame ($X^N$, $Y^N$) with the measurement $\vec{v}_{GNSS}$, of the same ground speed vector in order to obtain two speed difference components; and a sixth sub-step of applying a gain matrix (4×2 matrix) to the two speed difference components in order to prepare four corrections acting on the inputs of the four integrators relating respectively to the four states of the estimator of the invention.

In the sixth sub-step, the gain matrix (4×2 matrix) may be calculated using the equations of the Kalman filter, for example.

This sixth sub-step thus makes it possible to close the loop of the linear estimator of the invention and to ensure that the four states of the state vector x(t) are optimum estimates.

Also, the third, fourth, and fifth sub-states may alternatively apply the so-called "small angles" approximation when operating conditions allow that. As a result, the above-described linear estimator, when not based on the "small angles" approximation, is used during an initial convergence stage, and then another estimator, based on the "small angles" approximation applying a model that is made linear by using the "small angles" assumption is used subsequently, as soon as convergence is achieved on the estimate $\Delta\psi$ of the error affecting the directional estimate of the heading.

By way of example, these operating conditions may be characterized by the covariance associated with the estimate $\Delta\psi$ of the error affecting the directional estimate $\psi_{DIR}$ of the heading and/or the modulus of the sub vector formed by the estimated values $S\Delta\psi$, $C\Delta\psi$ for the sine and the cosine of the estimate $\Delta\psi$ of the error affecting the directional estimate of the heading.

Furthermore, the preparation third step may include a seventh and last sub-step of calculating the estimated value $\psi$ of the geographical heading of the aircraft.

BRIEF DESCRIPTION OF THE DRAWINGS

The invention and its advantages appear in greater detail in the context of the following description of embodiments given by way of illustration and with reference to the accompanying figures, in which.

Elements that are present in more than one of the figures are given the same references in each of them.

DETAILED DESCRIPTION OF THE INVENTION

Figures 1, 3, 4, 5:
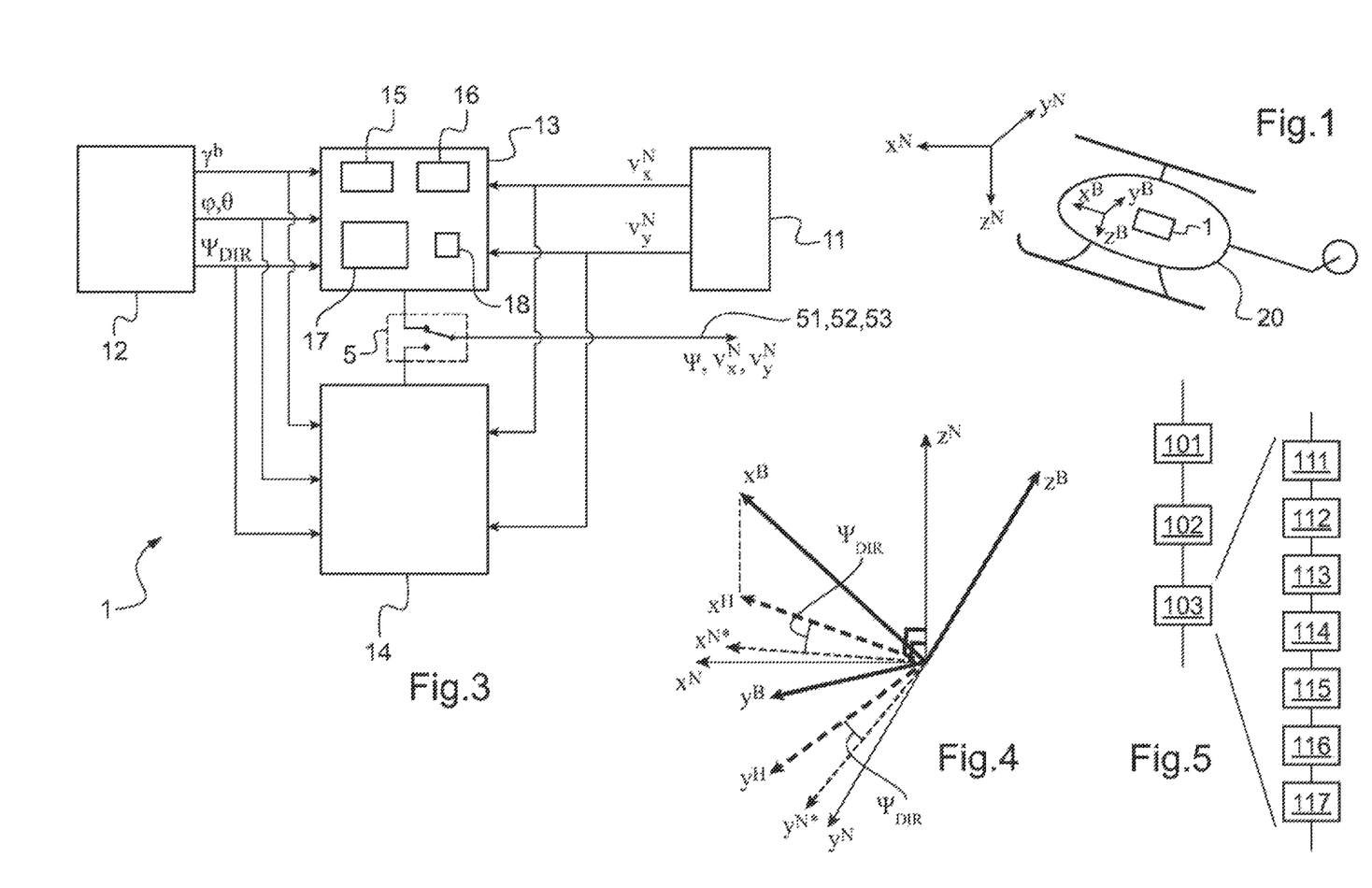
FIG. 1 shows a rotary wing aircraft.
FIG. 3 shows a variant of such a device.
FIG. 4 shows the various reference frames used by the device.
FIG. 5 is a diagram summarizing a method of estimating the ground speed and the heading of an aircraft.

In FIG. 1, there can be seen a rotary wing aircraft 20. A fuselage reference frame ($X^B$, $Y^B$, $Z^B$) is rigidly associated with the aircraft 20, e.g. being attached to the mean center of gravity of the aircraft 20. The fuselage reference frame ($X^B$, $Y^B$, $Z^B$) is defined by particular directions of the aircraft 20, which are respectively the longitudinal direction $X^B$ contained in the plane of symmetry of the aircraft 20, parallel to the floor of the passenger cabin of the aircraft 20, and extending from the rear to the front of the aircraft 20, the normal direction $Z^B$ extending downwards perpendicularly to the longitudinal direction $X^B$, and the transverse direction $Y^B$ extending from left to right perpendicularly to the longitudinal direction $X^B$ and to the normal direction $Z^B$. The longitudinal direction $X^B$ is the roll axis of the aircraft 20, the transverse direction $Y^B$ is its pitching axis, and the normal direction $Z^B$ is its yaw axis.

A geographical reference frame ($X^N$, $Y^N$, $Z^N$) is also shown in FIG. 1. This geographical reference frame ($X^N$, $Y^N$, $Z^N$) is formed on the basis of the directions of cardinal points, e.g. by the directions North and East respectively constituting the directions $X^N$, $Y^N$, and by a direction $Z^N$ substantially parallel to the Earth's gravity. The directions $X^N$, $Y^N$ thus form a substantially horizontal plane ($X^N$, $Y^N$).

Figure 2:
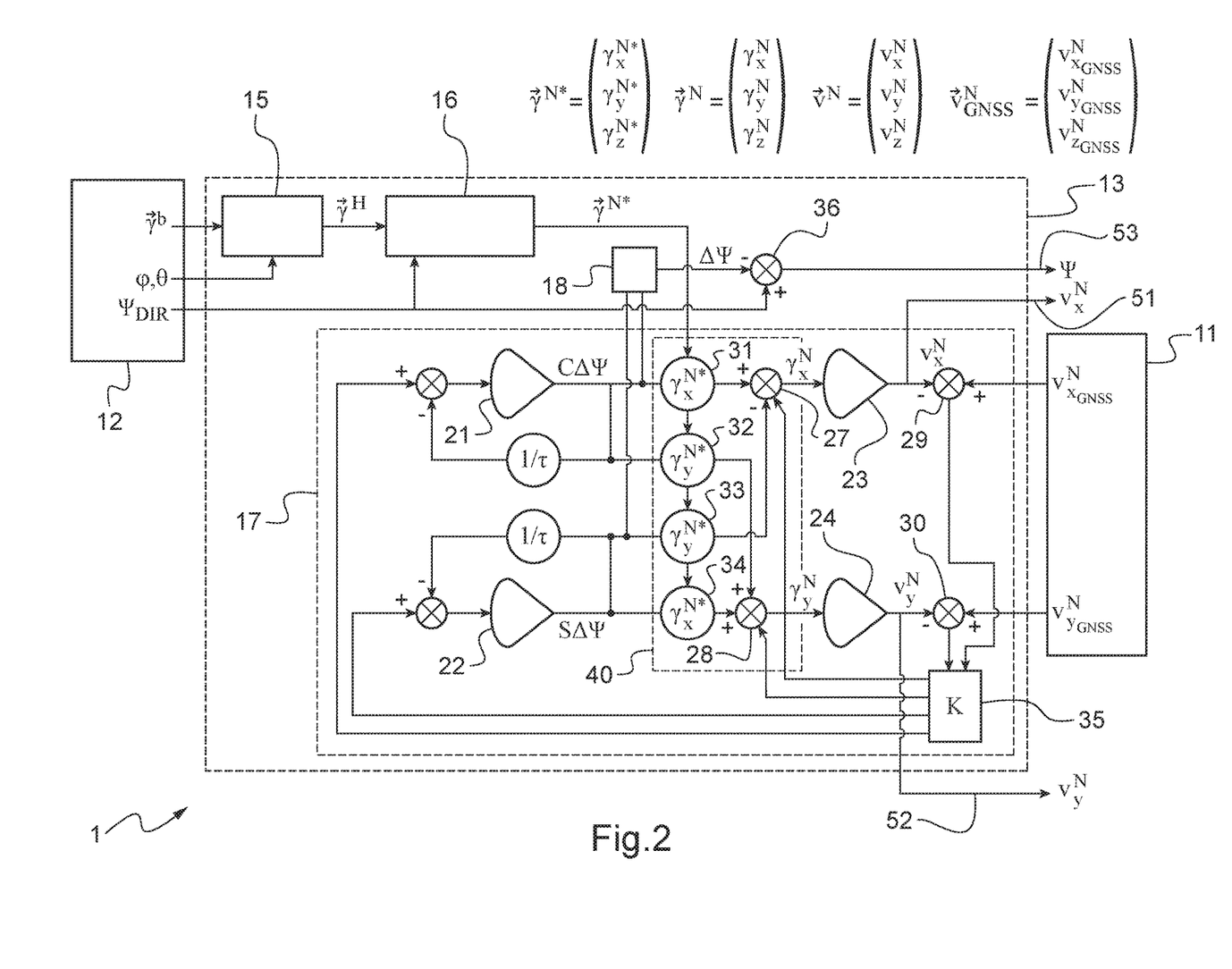
FIG. 2 shows a device of the invention for estimating the ground speed and the heading of an aircraft.

The aircraft 20 includes a device 1 for estimating the ground speed and the heading of the aircraft 20, which device is shown in detail in FIG. 2. A variant of this device 1 is also shown in FIG. 3. This device 1 and its variant are suitable for implementing a method of estimating the ground speed and the heading of an aircraft, which method is summarized diagrammatically in FIG. 5. The method comprises three main steps 101 to 103, the third step 103 comprising seven sub-steps 111 to 117.

The device 1 comprises a GNSS receiver 11, an AHRS device 12, and a first estimator 13 connected to the GNSS receiver 11 and to the AHRS device 12. The GNSS receiver 11 provides the first estimator 13 with a measurement $\vec{v}_{GNSS}$ of a first ground speed vector of the aircraft 20 in the geographical reference frame ($X^N$, $Y^N$, $Z^N$), while the AHRS device 12 provides the first estimator 13 with a measurement $\vec{\gamma}^B$ of an acceleration vector of the aircraft 20 in the fuselage reference frame ($X^B$, $Y^B$, $Z^B$), together with estimates $\varphi$ and $\theta$ of the attitude angles, and a directional estimate $\psi_{DIR}$ of the heading of the aircraft 20. The directional estimate $\psi_{DIR}$ of the heading is determined in particular without using any magnetic measurement.

As shown in FIG. 2, the first estimator 13 comprises two projection operators 15, 16 and a linear estimator 17.

The first projection operator 15 serves to perform a transfer from the fuselage reference frame ($X^B$, $Y^B$, $Z^B$) to a local reference frame ($X^H$, $Y^H$) formed by a projection $X^H$ of the direction $X^B$ onto a plane that is horizontal, and thus parallel to the plane ($X^N$, $Y^N$), possibly coinciding therewith, and by a direction $Y^H$ perpendicular to the projection $X^H$ and situated in the same horizontal plane.

This first projection operator 15 thus enables the measurement $\vec{\gamma}^B$ of the acceleration vector to be projected onto this local horizontal reference frame ($X^H$, $Y^H$) in order to determine an estimate $\vec{\gamma}^H$ of the horizontal component of the acceleration vector of the aircraft 20.

The second projection operator 16 serves to perform a transfer from the local horizontal reference frame ($X^H$, $Y^H$) to a horizontal pseudo-geographical reference frame ($X^{N*}$, $Y^{N*}$) defined on the basis of the local horizontal reference frame ($X^H$, $Y^H$) and of the directional estimate $\psi_{DIR}$ of the heading. The directions $X^{N*}$ and $Y^{N*}$ are situated in a horizontal plane, and each of them forms an angle equal to the directional estimate $\psi_{DIR}$ of the heading with a respective one of the directions $X^H$ and $Y^H$. The second projection operator 16 thus serves to transfer the estimate $\vec{\gamma}^H$ of the horizontal component of the acceleration vector into this horizontal pseudo-geographical reference frame ($X^{N*}$, $Y^{N*}$) so as to determine a pseudo-geographical estimate $\vec{\gamma}^{N*}$ of the acceleration vector of the aircraft 20.

FIG. 4 shows these various reference frames and the relationships between them.

The linear estimator 17 comprises integrators 21 and 22 for estimating values $C\Delta\psi$ and $S\Delta\psi$ for the sine and the cosine of the angular difference between the pseudo-geographical reference frame and the geographical reference frame The linear estimator 17 has a linear transformation operator 40 for transforming the horizontal pseudo-geographical reference frame ($X^{N*}$, $Y^{N*}$) to an estimate of the horizontal geographical reference frame ($X^N$, $Y^N$). This linear transformation operator 40 is constituted by gain operators 31-34 together with a difference operator 27 and a sum operator 28. The matrix operation performed by these six scalar operators is the following:

$$\begin{pmatrix} \gamma_x^N \\ \gamma_y^N \end{pmatrix} = \begin{pmatrix} C\Delta\psi & -S\Delta\psi \\ S\Delta\psi & C\Delta\psi \end{pmatrix} \begin{pmatrix} \gamma_x^{N*} \\ \gamma_y^{N*} \end{pmatrix}.$$

The person skilled in the art will recognize in the matrix operator an operator for turning through an angle $\Delta\psi = \tan^{-1}(C\Delta\psi, S\Delta\psi)$ in the horizontal plane ($X^N$, $Y^N$), since $C_{\Delta\psi}^2 + S_{\Delta\psi}^2 = 1$.

Starting from the estimate $\vec{\gamma}_{N*}$ of the acceleration vector in the pseudo-geographical reference frame, said linear transformation operator 40 prepares an estimate $\vec{\gamma}^N$ of the acceleration vector in the geographical reference frame, taking account of the estimate $\Delta\psi$ of the error that affects the directional estimate $\psi_{DIR}$ of the heading.

The linear estimator 17 has integrators 23, 24 for integrating the estimate $\vec{\gamma}^N$ of said acceleration vector in the geographical reference frame in order to obtain the estimate $\vec{v}^N$ of the ground speed vector in the geographical reference frame, taking account of the estimate $\Delta\psi$ of the error affecting the directional estimate $\psi_{DIR}$ of the heading. The linear estimator 17 also has difference operators 29, 30 calculating the difference between firstly each of the components ($v_x^N$, $v_y^N$) of said estimate $\vec{v}^N$ of the ground speed vector in the geographical reference frame, taking account of the estimate $\Delta\psi$ of the error affecting the directional estimate $\psi_{DIR}$ of the heading, and secondly each of the components ($v_{x_{GNSS}}^N$, $v_{y_{GNSS}}^N$) of the measurement $\vec{v}_{GNSS}^N$ of the ground speed vector $\vec{v}^N$ in the geographical reference frame ($X^N$, $Y^N$, $Z^N$).

The linear estimator 17 comprises a matrix gain operator K of dimensions (4×2), referenced 35 in FIG. 2, which propagates the components of a speed difference vector on each of the inputs of integrators 21, 22, 23, and 24, such that:

$$\begin{pmatrix} CorCRate \\ CorSRate \\ CorVxRate \\ CorVyRate \end{pmatrix} = \begin{pmatrix} k_{cx} & k_{cy} \\ k_{sx} & k_{sy} \\ k_{xx} & k_{xy} \\ k_{yx} & k_{yy} \end{pmatrix} \begin{pmatrix} \Delta v_x^N \\ \Delta v_y^N \end{pmatrix};$$

$$\text{with } \begin{pmatrix} k_{cx} & k_{cy} \\ k_{sx} & k_{sy} \\ k_{xx} & k_{xy} \\ k_{yx} & k_{yy} \end{pmatrix} = K.$$

The elements of the matrix K may for example be "Kalman gains" calculated from the Riccati differential equation.

In this linear estimator 17, the state vector x(t) has four states, which are the estimated values $v_x^N$, $v_y^N$ of the horizontal components of the ground speed vector of the aircraft 20 in the horizontal plane of the geographical reference frame ($X^N$, $Y^N$, $Z^N$) and the estimated values $C\Delta\psi$ and $S\Delta\psi$ of the cosine and of the sine of an estimate $\Delta\psi$ of the error affecting the directional estimate $\psi_{DIR}$ of the heading.

The four states of the linear estimator 17 converge as soon as the aircraft 20 undergoes a stage of acceleration. In particular, the states $C\Delta\psi$ and $S\Delta\psi$ carried by the integrators 21 and 22 then constitute accurate estimates of the sine and the cosine of the angular error $\Delta\psi$ affecting the directional estimate $\psi_{DIR}$ of the heading prepared by the AHRS device 12.

By way of example, the calculation of the gain matrix K is based on the known equations of the Kalman filter, itself based on the above described linear model of the process.

Finally, the first estimator 13 has an "A TAN 2" trigonometrical calculation block 18 and a difference operator 36. The "A TAN 2" trigonometrical calculation block 18 serves to determine an estimate $\Delta\psi$ of the error affecting the directional estimate $\psi_{DIR}$ of the heading on the basis of the estimated values $C\Delta\psi$ and $S\Delta\psi$ for the cosine and the sine of this estimate $\Delta\psi$ by applying the two-argument trigonometrical function "A TAN 2" to the two estimated values $S\Delta\psi$ and $C\Delta\psi$. The difference operator 36 then enables this estimate $\Delta\psi$ to be subtracted from the directional estimate $\psi_{DIR}$ of the heading as prepared by the AHRS device 12 in order to generate an estimated value $\psi$ for the geographical heading, in which the gyro measurement inaccuracies of the heading are corrected, and which, furthermore, is unaffected by potential magnetic disturbances in the environment of the aircraft 20. This estimated value $\psi$ of the geographical heading of the aircraft 20 constitutes an output 53 of the device 1.

In addition, the device 1 has two other outputs 51, 52 constituted by the estimated values $v_x^N$, $v_y^N$ for the horizontal components of the ground speed vector that take account of the estimate $\Delta\psi$ of the error.

Furthermore, in the variant shown in FIG. 3, the device 1 has a switch 5 and a second estimator 14 operating using the so-called "small angles" approximation, and thus applying a model that relies on the "small angles" assumption. The switch 5 is arranged between the first estimator 13 and the second estimator 14. As a result, the outputs 51, 52, and 53 of the device 1 are constituted by the outputs of the switch 5. The switch 5 thus makes it possible to switch between the first estimator 13 and the second estimator 14. The first and second estimators 13, 14 and the switch 5 may form integral portions of a computer present in the aircraft 20.

The first estimator 13 operates during an initial convergence stage, and thereafter it is replaced by the second estimator 14, once convergence has been achieved on the estimate $\Delta\psi$ of the error affecting the directional estimate $\Delta\psi$ of the heading. The second estimator 14 then needs to process only a residual angular error that is of small amplitude, and it can therefore rely on the "small angles" approximation in its own structure for estimating the residual angular error. The reduction in the number of states (a single estimator, directly estimating $\Delta\psi$, instead of two, estimating the sine and the cosine of the error angle) improves the accuracy of the estimate $\Delta\psi$ and consequently the accuracy of the estimated values $v_x^N$, $v_y^N$ and $\psi$ for the ground speed of the aircraft 20 and for the geographical heading.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A device for estimating ground speed and heading of an aircraft, the aircraft having three axes forming a fuselage reference frame rigidly associated with a structure of the aircraft, the device comprising:
a global navigation satellite system (GNSS) receiver receiving signals from a plurality of satellites and configured to provide a measurement of a speed vector relative to the ground of the aircraft in a geographical reference frame, the geographical reference frame including a horizontal plane;
an attitude and heading reference system (AHRS) device providing a measurement of an acceleration vector of the aircraft in the fuselage reference frame together with estimates of the attitude angles, and a directional estimate of the heading of the aircraft; and
a first estimator connected to the GNSS receiver and to the AHRS;
wherein the first estimator is linear and configured to prepare an estimate of an unbounded error affecting the directional estimate of the heading determined by the AHRS device by combining the measurement of the speed vector relative to the ground with the estimates of the attitude angles, with the directional estimate of the heading, and with the measurement of the acceleration vector, independently of any magnetic measurement.

2. The device according to claim 1, wherein the first estimator is a linear estimator having at least four states, which are estimated values for horizontal components of the speed vector relative to the ground of the aircraft in the geographical reference frame, and estimated values for the values of cosine and of sine of the estimate of the unbounded error affecting the directional estimate of the heading.

3. The device according to claim 2, wherein the first estimator performs trigonomic calculations to determine the estimate of the unbounded error from the estimated values and for the cosine and for the sine, and performs a difference operation to subtract the estimate of the unbounded error from the directional estimate of the heading determined by the AHRS device in order to generate an estimated value for a geographical heading of the aircraft that is unaffected by potential magnetic disturbances of the environment of the aircraft.

4. The device according to claim 2, wherein the device includes two outputs constituted by the estimated values for the horizontal components of the speed vector relative to the ground, which values take account of the estimate of the unbounded error.

5. The device according to claim 2, wherein the first estimator applies the equations of a Kalman filter based on a model of a process, in continuous time, such that:

$$\frac{d}{dt}x(t) = F(t) \cdot x(t) + w_c(t), \text{ and } z(t) = H(t) \cdot x(t) + w_m(t);$$

with:

$$x(t) = \begin{pmatrix} C\Delta\psi \\ S\Delta\psi \\ v_x^N \\ v_y^N \\ \ldots \end{pmatrix}$$

being a state vector comprising at least the four states, namely the estimated values for the cosine and for the sine of the estimate of the unbounded error and the estimated values for the horizontal components of the speed vector relative to the ground of the aircraft in the geographical reference frame;
$w_c(t)$ being a control noise vector;
$w_m(t)$ being a measurement noise vector;

$$z(t) = \begin{pmatrix} v_x^N \\ v_y^N \\ \dots \end{pmatrix}$$

being an estimation vector of the measurement comprising at least the two estimated values for the horizontal components of the speed vector relative to the ground of the aircraft in the geographical reference frame;

$$F(t) = \begin{pmatrix} -\frac{1}{\tau} & 0 & 0 & 0 & \dots \\ 0 & -\frac{1}{\tau} & 0 & 0 & \dots \\ \gamma_x^{N*} & -\gamma_y^{N*} & 0 & 0 & \dots \\ \gamma_y^{N*} & \gamma_x^{N*} & 0 & 0 & \dots \\ \dots & \dots & \dots & \dots & \dots \end{pmatrix}$$

being a sub-matrix of a matrix relating the derivative of the state vector to the state vector; and $$H(t) = \begin{pmatrix} 0 & 0 & 1 & 0 & \dots \\ 0 & 0 & 0 & 1 & \dots \\ \dots & \dots & \dots & \dots & \dots \end{pmatrix}$$

being a sub-matrix of a measurement matrix relating the estimation vector of the measurement to the state vector.

6. The device according to claim 1, wherein the device includes a second estimator operating with a model that is linearized by the "small angles" assumption, the first estimator operating during an initial convergence stage and subsequently being replaced by the second estimator for continuing to prepare the estimate of the unbounded error affecting the directional estimate of the heading, and consequently to refine the estimated values and for the horizontal components of the vector of the speed relative to the ground and for a geographical heading of the aircraft.

7. The device according to claim 6, wherein the second estimator replaces the first estimator from the instant at which the covariance associated with the estimate of the unbounded error becomes less than a first predetermined threshold.

8. The device according to claim 6, wherein the second estimator replaces the first estimator from the instant at which the modulus of the vector formed by the estimated values for sine and cosine of the estimate of the unbounded error become close to unity, to within a margin, such that:

$$|1 - \sqrt{(S\Delta\psi)^2 + (C\Delta\psi)^2}| < \text{margin}.$$

9. The device according to claim 6, wherein the second estimator replaces the first estimator from the instant at which the covariance associated with the estimate of the unbounded error becomes less than a first predetermined threshold, or else from the instant at which the modulus of the vector formed by the estimated values for sine and cosine of the unbounded error become close to unity, to within a margin, such that:

$$|1 - \sqrt{(S\Delta\psi)^2 + (C\Delta\psi)^2}| < \text{margin}.$$

10. The device according to claim 1, wherein the first estimator:

performs a first projection operation for projecting the fuselage reference frame onto a local horizontal reference frame, the local horizontal reference frame being formed firstly by a projection onto a horizontal plane of the direction of the fuselage reference frame, and secondly by a direction perpendicular to the projection and situated in the horizontal plane;

performs a second projection operation for projecting the local horizontal reference frame onto a horizontal pseudo-geographical reference frame, the horizontal pseudo-geographical reference frame being defined from the local horizontal reference frame and from the directional estimate of the heading, the directions of the horizontal pseudo-geographical reference frame each forming an angle equal to the directional estimate of the heading with a respective one of the directions of the local horizontal reference frame; and performs a linear transformation operation for transforming the horizontal pseudo-geographical reference frame into an estimate of the horizontal plane, with the angle between the estimate of the horizontal plane and the horizontal pseudo-geographical reference frame being the estimate of the unbounded error affecting the directional estimate of the heading; and the first estimator comprising a feedback loop having its gains calculated using the equations of a Kalman filter.

11. The device according to claim 1, wherein the horizontal plane of the geographical reference frame is substantially perpendicular to the Earth's gravity direction.

12. A method of estimating speed relative to the ground and heading of an aircraft, wherein the method comprises:
providing a measurement of a speed vector relative to the ground of the aircraft in a geographical reference frame, by receiving signals from a plurality of satellites, the geographical reference frame including a horizontal plane;
providing a measurement of an acceleration vector of the aircraft in a fuselage reference frame rigidly associated with the aircraft, together with estimates of attitude angles and a directional estimate of the heading of the aircraft; and
preparing an estimate of an unbounded error affecting the directional estimate of the heading, which preparation is performed in a manner that is linear by combining the measurement of the speed vector relative to the ground with the estimates of the attitude angles, with the directional estimate of the heading, and with the measurement of the acceleration vector.

13. The method according to claim 12, wherein the preparing the estimate of the unbounded error affecting the directional estimate of the heading comprises the following sub-steps:
projecting the measurement of the acceleration vector onto a local horizontal reference frame while using the estimates of the attitude angles in order to obtain an estimate of a horizontal component of the acceleration vector, the local horizontal reference frame being formed firstly by a projection of the direction of the fuselage reference frame onto a horizontal plane, and secondly by a direction perpendicular to the projection and situated in the horizontal plane;
projecting the estimate of the horizontal component of the acceleration vector onto a horizontal pseudo-geographical reference frame in order to obtain a pseudo-geographical estimate of a horizontal component of the acceleration vector, the horizontal pseudo-geographical reference frame being defined from the local horizontal reference frame and from the directional estimate of the heading, the directions of the horizontal pseudo-geographical reference frame each forming an angle equal to the directional estimate of the heading with a respective one of the directions of the local horizontal reference frame;

linearly transforming the pseudo-geographical estimate of the horizontal component in the pseudo-geographical reference frame of the acceleration vector into an estimate of a horizontal component in a geographical reference frame of the acceleration vector, the estimate being corrected with the estimate of the unbounded error affecting the directional estimate of the heading, by means of the estimated values;

integrating the estimate of the horizontal component of the acceleration vector in the pseudo-geographical reference frame in order to obtain an estimate of the speed vector relative to the ground in the horizontal geographical reference frame, taking account of the estimate of the unbounded error affecting the directional estimate of the heading;

comparing the estimate of the speed vector relative to the ground in the horizontal geographical reference frame with the measurement of the speed vector relative to the ground; and preparing corrections acting on the estimate of the unbounded error and on the estimate of the speed vector relative to the ground.

14. The method according to claim 13, wherein the preparing the estimate of the unbounded error affecting the directional estimate of the heading includes calculating the estimated value of the geographical heading.

15. The method according to claim 13, wherein the preparing corrections acting on the estimate of the unbounded error and on the estimate of the speed vector relative to the ground applies a Kalman filter having at least four states, which are the estimated values for the horizontal component of the speed vector relative to the ground in the geographical reference frame, and also the estimated values and for cosine and sine of the estimate of the unbounded error affecting the directional estimate of the heading.

16. The method according to claim 13, wherein the preparing the estimate of the unbounded error affecting the directional estimate of the heading applies a model that is linearized by the "small angles" assumption as from the instant at which the covariance associated with the estimate of the unbounded error becomes less than a first predetermined threshold, or else the modulus of the vector formed by the estimated values for sine and cosine of the estimate of the unbounded error come close to unity, to within a margin, such that:

$$|1-\sqrt{(S\Delta\psi)^2+(C\Delta\psi)^2}|<\text{margin}.$$

17. The method according to claim 12, wherein the horizontal plane of the geographical reference frame is substantially perpendicular to the Earth's gravity direction.

18. A device for estimating ground speed and heading of an aircraft, the aircraft having three axes forming a fuselage reference frame rigidly associated with a structure of the aircraft, the device comprising:

a global navigation satellite system (GNSS) receiver receiving signals from a plurality of satellites and configured to provide a measurement of a speed vector relative to the ground of the aircraft in a geographical reference frame, the geographical reference frame including a horizontal plane;

an attitude and heading reference system (AHRS) device providing a measurement of an acceleration vector of the aircraft in the fuselage reference frame together with estimates of the attitude angles, and a directional estimate of the heading of the aircraft; and a first estimator connected to the GNSS receiver and to the AHRS;

wherein the first estimator is linear and configured to prepare an estimate of an unbounded error affecting the directional estimate of the heading determined by the AHRS device by combining the measurement of the speed vector relative to the ground with the estimates of the attitude angles, with the directional estimate of the heading, and with the measurement of the acceleration vector, independently of any magnetic measurement; and wherein the device includes a second estimator operating with a model that is linearized by the "small angles" assumption, the first estimator operating during an initial convergence stage and subsequently being replaced by the second estimator for continuing to prepare the estimate of the unbounded error affecting the directional estimate of the heading, and consequently to refine the estimated values and for the horizontal components of the vector of the speed relative to the ground and for a geographical heading of the aircraft.

19. The device according to claim 18, wherein the horizontal plane of the geographical reference frame is substantially perpendicular to the Earth's gravity direction.

20. A method of estimating speed relative to the ground and heading of an aircraft, wherein the method comprises:

providing a measurement of a speed vector relative to the ground of the aircraft in a geographical reference frame, by receiving signals from a plurality of satellites, the geographical reference frame including a horizontal plane;

providing a measurement of an acceleration vector of the aircraft in a fuselage reference frame rigidly associated with the aircraft, together with estimates of attitude angles and a directional estimate of the heading of the aircraft; and preparing an estimate of an unbounded error affecting the directional estimate of the heading, which preparation is performed in a manner that is linear by combining the measurement of the speed vector relative to the ground with the estimates of the attitude angles, with the directional estimate of the heading, and with the measurement of the acceleration vector;

wherein the preparing the estimate of the unbounded error affecting the directional estimate of the heading comprises the following sub-steps:

projecting the measurement of the acceleration vector onto a local horizontal reference frame while using the estimates of the attitude angles in order to obtain an estimate of a horizontal component of the acceleration vector, the local horizontal reference frame being formed firstly by a projection of the direction of the fuselage reference frame onto a horizontal plane, and secondly by a direction perpendicular to the projection and situated in the horizontal plane;

projecting the estimate of the horizontal component of the acceleration vector onto a horizontal pseudo-geographical reference frame in order to obtain a pseudo-geographical estimate of a horizontal component of the acceleration vector, the horizontal pseudo-geographical reference frame being defined from the local horizontal reference frame and from the directional estimate of the heading, the directions of the horizontal pseudo-geographical reference frame each forming an angle equal to the directional estimate of the heading with a respective one of the directions of the local horizontal reference frame;

linearly transforming the pseudo-geographical estimate of the horizontal component in the pseudo-geographical reference frame of the acceleration vector into an estimate of a horizontal component in the geographical reference frame of the acceleration vector, the estimate being corrected with the estimate of the unbounded error affecting the directional estimate of the heading, by means of the estimated values;

integrating the estimate of the horizontal component of the acceleration vector in the pseudo-geographical reference frame in order to obtain an estimate of the speed vector relative to the ground in the horizontal geographical reference frame, taking account of the estimate of the unbounded error affecting the directional estimate of the heading;

comparing the estimate of the speed vector relative to the ground in the horizontal geographical reference frame with the measurement of the speed vector relative to the ground; and preparing corrections acting on the estimate of the unbounded error and on the estimate of the speed vector relative to the ground; and wherein, during certain stages, preparing the estimate of the unbounded error affecting the directional estimate of the heading applies a model that is linearized by the "small angles" assumption.

* * * * *